United States Patent

Chess et al.

[11] 4,191,640
[45] Mar. 4, 1980

[54] DUAL PRESSURE FRACTIONATION OF HYDROCARBONS

[75] Inventors: David D. Chess; Clements A. Helbling, Jr.; Randlow Smith, all of Houston, Tex.

[73] Assignee: Texaco Inc., White Plains, N.Y.

[21] Appl. No.: 919,197

[22] Filed: Jun. 26, 1978

[51] Int. Cl.² ............................ B01D 3/10; C10G 7/00
[52] U.S. Cl. ..................................... 208/348; 208/351; 208/355; 208/357
[58] Field of Search .................. 208/348, 351, 355, 357

[56] References Cited

U.S. PATENT DOCUMENTS

| | | | |
|---|---|---|---|
| 3,364,139 | 1/1968 | Hunesh et al. | 208/348 |
| 3,607,734 | 9/1971 | Stafford | 208/351 |
| 3,783,126 | 1/1974 | Hayward et al. | 208/351 |

Primary Examiner—Herbert Levine
Attorney, Agent, or Firm—Carl G. Ries; Thomas H. Whaley; Douglas H. May, Jr.

[57] ABSTRACT

An improved dual fractionating process for hydrocarbons which employs a high pressure and a low pressure fractionating zone, light ends from the low pressure fractionating zone being introduced into the high pressure fractionating zone, heavy ends from the high pressure fractionating zone being introduced into the low pressure fractionating zone, the improvement being characterized by the introduction into one of the fractionating zones of a stable hydrocarbon stream, the hydrocarbon stream being stable under the conditions existing in the high pressure fractionating zone, at least a portion of the hydrocarbon stream having a boiling point lower than the boiling point of at least one of the unstable components which accumulates in the high pressure fractionating zone.

24 Claims, 2 Drawing Figures

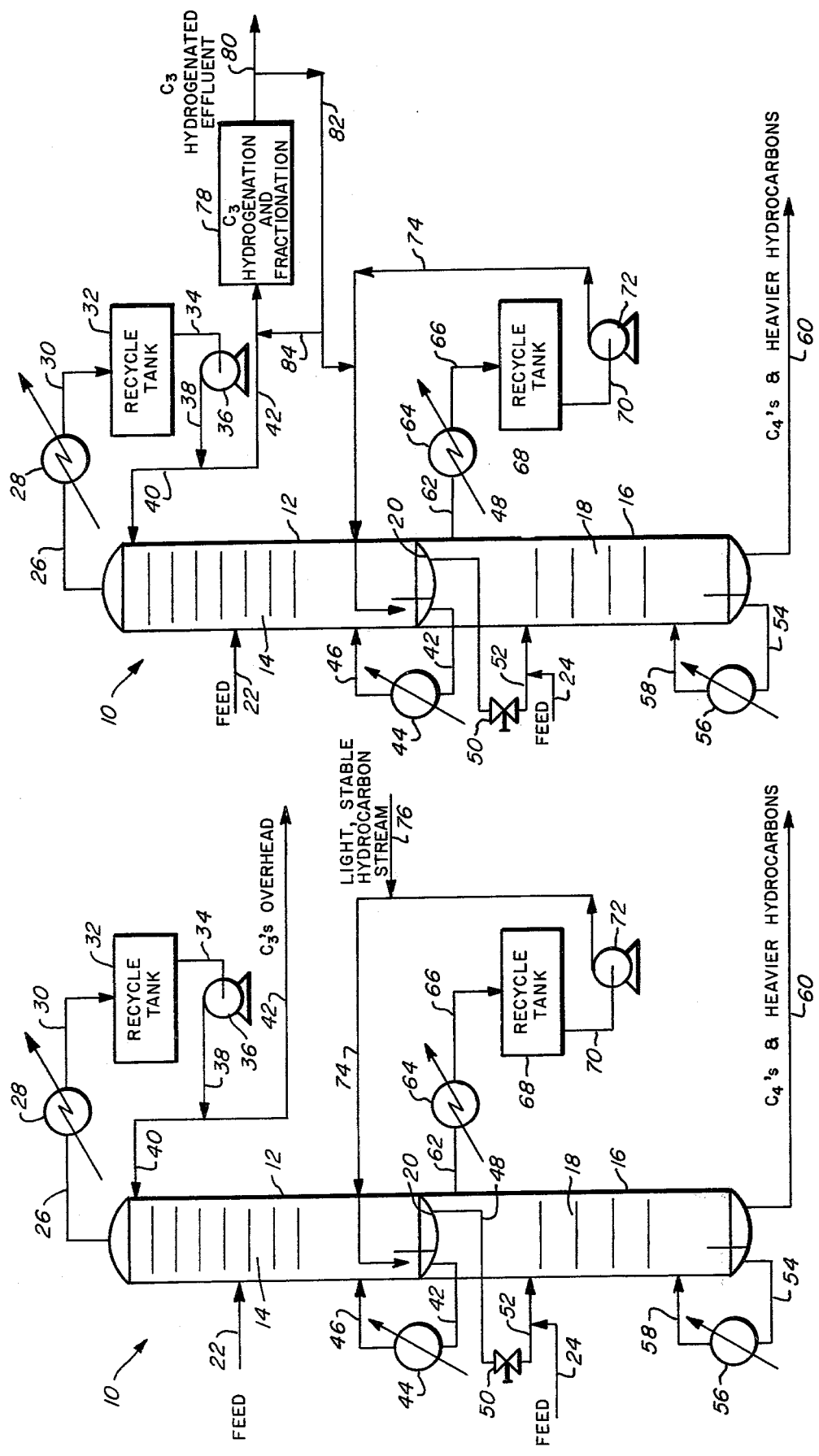

DUAL PRESSURE FRACTIONATION OF HYDROCARBONS

BACKGROUND OF THE INVENTION

The present invention relates to dual pressure fractionating processes. More particularly, the present invention relates to an improved dual pressure fractionating process for hydrocarbons such as for example the depropanization of hydrocarbons.

The use of so-called "dual pressure" fractionating of hydrocarbons has been used, with great success, for the depropanization of hydrocarbons. The dual pressure process, which is described in detail in U.S. Pat. No. 3,783,126 (herein incorporated by reference for all purposes) eliminates many of the problems associated with prior art depropanizer processes. For one, polymerization of highly unsaturated compounds within the fractionating column is largely eliminated. Using the dual pressure process, and as applied to the depropanization of hydrocarbons, temperature and pressure conditions in the high pressure section of the fractionating column can be chosen to be compatible with optimum vaporization of the $C_3$'s and condensation of the vapors at easily attainable temperatures. Additionally, temperatures and pressures in the low pressure section of the fractionating column can be chosen to achieve a temperature which will minimize polymerization of the bottoms fraction in the low pressure section. As the cited patent points out, other advantages are achieved using the dual pressure process.

Although the dual pressure process possesses many advantages, there are certain inherent disadvantages, at least one of which is potentially dangerous. It has been found that when the process is used in the depropanization of hydrocarbons, there is a tendency for certain unstable components to accumulate or build-up in the high pressure section of the fractionating column, usually in the lower section thereof. These unstable components, which vary depending upon the nature of the feed to the fractionating column, are generally highly unsaturated in nature, e.g. acetylenes, dienes and the like. It is known that high concentrations of such highly unstable components can be detonated in the absence of oxygen, if subjected to elevated temperatures and pressures. Moreover, detonation of such unstable components can occur at lower concentrations and lower system temperatures and pressures if an ignition source is present. Such ignition source can be provided, for example, by static electrictiy caused by high fluid flows in the column, highly exothermic polymerization and other type reactions, etc.

SUMMARY OF THE INVENTION

It is therefore an object of the present invention to provide an improved dual pressure fractionating process.

A further object of the present invention is to provide an improved dual pressure fractionating process for the depropanization of hydrocarbons.

Still a further object of the present invention is to provide an improved dual pressure fractionating process for fractionating hydrocarbons containing unstable components.

The above and other objects of the invention will become apparent from the drawings, the description given herein and the appended claims.

The present invention represents an improvement in the field of dual pressure fractionation and, in a specific case, an improvement in the dual pressure fractionation process for depropanizing hydrocarbons set forth in U.S. Pat. No. 3,783,126. The improvement comprises the introduction into one of the zones of the fractionating column of a stable hydrcarbon stream, stable in the sense that the hydrocarbon stream does not undergo any substantial chemical reactions under the conditions of temperature and pressure existing in the high pressure section of the fractionating column. Generally speaking, the stable hydrocarbon stream will contain component(s) which have a boiling point lower than at least one of the unstable components which accumulates in the high pressure section of the fractionating column. Thus, for example, in the depropanization of hydrocarbons, a suitable, stable hydrocarbon stream would comprise a stream of propane.

DESCRIPTION OF THE DRAWINGS

FIG. 1 is a schematic flow sheet depicting one embodiment of the process of the present invention.

FIG. 2 is a schematic flow sheet depicting another embodiment of the process of the present invention.

DESCRIPTION OF THE PREFERRED EMBODIMENTS

While the process of the present invention will be described with particular reference to the depropanization of hydrocarbons, it is to be understood that the process is applicable to the fractionation of any hydrocarbon stream(s) wherein fractionation can be enhanced in a dual pressure operation, and wherein the hydrocarbon stream(s) being processed contains unstable components. The improved process is particularly applicable to the dual pressure fractionation of hydrocarbon feeds containing $C_6$ and lower olefinic and/or acetylenic compounds.

The term "unstable components" as used herein, refers to hydrocarbons which are generally highly unsaturated in nature, which can be detonated without oxygen present if subjected to sufficiently high temperatures and pressures and which, in general, are compounds which are highly endothermic in nature. The endothermic nature of such highly unsaturated compounds makes them inherently unstable when subjected to elevated pressures, the problem being compounded if temperatures are also elevated. Non-limiting examples of such unstable components include materials such as acetylene, propyne, allene (propodiene), methyl acetylene, etc. The above mentioned and similar compounds are encountered in depropanization processes for hydrocarbon streams comprised primarily of $C_3$ and $C_4$ compounds. As noted, the dual pressure fractionation process can be employed with other hydrocarbon feed stocks other than those comprised primarily of $C_3$'s and $C_4$'s. It finds particular application, however, in the treatment of generally olefinic containing hydrocarbon feed stocks comprised of $C_6$ and lighter hydrocarbons. While in the usual case, the unstable components are originally present in the hydrocarbon feed stock, it is possible that such components are formed during the fractionation process. Accordingly, it is intended within the scope of the present invention to include within the term unstable components, compounds which are not originally present in the hydrocarbon feed stock but which are formed during the fractionation process.

While in the description which follows, the process is described with reference to a fractionation tower contained in a single structure, it will be apparent that, from a structural standpoint, the fractionation tower can be separated into two distinct tower structures which are operated at the respective preferred temperatures and pressures for the particular fractionation process being conducted.

Referring then to the drawings, wherein like characters are used to designate like elements, and particularly to FIG. 1, there is shown a fractionation tower 10 comprised of a high pressure fractionation tower section 12 providing a high pressure fractionating zone 14, and a low pressure fractionation tower section 16 providing a low pressure fractionating zone 18. As is typical in fractionation towers, the upper tower section 12, which is the high pressure section, may be provided primarily with rectifying trays. The lower tower section, which in the illustrated embodiment is the low pressure section, may be provided principally with stripping trays. However, it will be appreciated that the distribution and number of rectifying trays and stripping trays is a function of the particular type of fractionation and the composition of the feed(s) to the tower(s). Thus, the high pressure section may, with advantage, include several stripping trays near the bottom thereof while the low pressure section may include several rectifying trays near the top thereof.

Sections 12 and 16 of tower 10 are separated by a pressure tight wall 20 which ensures that fractionating zones 14 and 18 are separate and distinct with complete pressure sealing therebetween. As can be seen, in the embodiment shown, wall 20 also serves as a surface for collecting the heavier components present in the high pressure zone 14 and which drop to the bottom of high pressure zone 14 to form a bottoms fraction.

Hydrocarbon feed streams are introduced into fractionation column 10 through lines 22 and 24, line 22 introducing the feed into high pressure zone 14, and line 24 introducing the feed into low pressure zone 18. It will be appreciated that rather than having the feed introduced simultaneously into both fractionating zones it can be introduced into only one of the zones, if desired. Typical feed compositions may comprise 70 mol percent $C_3$'s and 30 mol percent $C_4$'s and heavier hydrocarbons in line 22 and 12 mol percent $C_3$'s and 88 mol percent $C_4$'s and heavier hydrocarbons in line 24.

Turning first to the operation in high pressure section 12, the light or overhead fraction, which in the case of the depropanization of hydrocarbons, will constitute primarily $C_3$'s and other light hydrocarbons, is removed from the upper part of high pressure section 12 via line 26. The high pressure overhead fraction is condensed in condenser 28 and cooled to a temperature between about 75° to about 110° F., e.g. 95° F., and introduced via line 30 into recycle tank 32. Part of the condensed overhead fraction in recycle tank 32 is returned, via line 34, pump 36, and lines 38 and 40 as reflux to the upper part of high pressure section 12. A product stream comprising $C_3$'s and lighter material is removed via line 42 for further processing.

The heavier components present in high pressure fractionating zone 14 collect as a bottoms fraction in the lower end formed by wall 20 of high pressure section 12. A first portion of the bottoms fraction in zone 14 is removed via line 42, passed into reboiler 44 where it is heated to a temperature of approximately 170° F. and is then returned to high pressure fractionating zone 14 via line 46.

A second portion of the bottoms fraction in high pressure section 12 is removed, via line 48, passed through pressure reduction valve 50, where the pressure is reduced to approximately 100 p.s.i.a. and introduced, together with fresh feed from line 24, into low pressure fractionating zone 18 through line 52. It will be appreciated that, if desired, the fresh feed in line 24 can be introduced directly into low pressure zone 18 without first being combined with the depressurized bottoms fraction in line 52.

The heavier material in low pressure fractionating zone 18 collects as a bottoms fraction in the lowermost portion of low pressure fractionation section 16. A portion of this bottoms fraction is removed via line 54 and introduced into reboiler 56, the temperature of the bottoms fraction being elevated to approximately 165° F. The heated, partially vaporized bottoms fraction from reboiler 56 is then returned to the low pressure fractionating zone 18 via line 58. A second bottoms fraction is removed from low pressure fractionation seciton 16 via line 60 and sent for further processing. The bottoms fraction removed via line 60 comprises primarily $C_4$'s and heavier hydrocarbons.

The overhead vapors in low pressure fractionating zone 18 are removed from low pressure fractionation section 16 via line 62 at approximately 100 p.s.i.a. and condensed in condenser 64. The condensed fluid leaves condenser 64 at a temperature of between about 75° to about 120° F., e.g. 95° F., and is introduced, via line 66 into recycle tank 68. Condensed overhead is removed from recycle tank 68 via line 70 and elevated in pressure by means of pump 72 to the same approximate pressure existing in high pressure fractionating zone 14. In the particular example involving the depropanization of hydrocarbons, the condensed fluid is elevated to a pressure of around 215 p.s.i.a. The pressurized condensed fluid is then introduced, via line 74, into high pressure fractionating zone 14. A slip stream of a light, stable hydrocarbon material, from a source not shown, is also introduced into a high pressure fractionating zone 14 via lines 76 and 74.

Referring now to FIG. 2, there is shown another embodiment of the present invention which differs from the embodiment shown in FIG. 1 only in that an alternate source of a light, stable hydrocarbon stream is provided. Pressures, temperatures, flow path and the like of the process depicted in FIG. 2 are, except for the differences described below, generally the same as those employed in the process shown is FIG. 1. The $C_3$ overhead stream removed from the high pressure fractionating section 12 and recovered via line 42 is passed through a $C_3$ hydrogenation and fractionation unit 78. Hydrogenation unit 78, which is of conventional design, converts at least a portion of the $C_3$ unsaturates, e.g. propylene, to a saturated hydrocarbon, e.g. propane. The effluent is removed from hydrogenation unit 78 via line 80, the bulk of which is sent on for further processing. As is conventional in such hydrogenation units, a portion of the effluent in line 80 is recycled via line 82 to line 42 and hence back into hydrogenation unit 78. A slip stream of the recycle stream 82 is removed via line 84, combined with the condensed, pressurized overhead from low pressure section 16 and introduced via line 74 into the high pressure zone 14. As will be seen, the $C_3$ hydrogenated slip stream which is introduced into high pressure section 12 serves the same purpose as the light, stable hydrocarbon stream introduced via line 76 in the embodiment depicted in FIG. 1.

The light, stable hydrocarbon stream which is introduced into the high pressure fractionating zone is comprised of a hydrocarbon material which, under the temperature and pressure conditions existing in the high temperature fractionating zone will not undergo any substantial chemical reactions. Thus, for example, it is a material which is not easily subject to polymerization, or which, in any event, does not readily undergo reactions which are exothermic in nature. Additionally, the light, stable hydrocarbon stream is thermally stable, i.e. it will not crack or degrade under the temperature and pressure conditions existing in the high pressure fractionating zone. The light, stable hydrocarbon stream, which may be a mixture of many components, will comprise at least one component which has a boiling point lower than the boiling point of at least one of the unstable components which accumulates in the high pressure fractionating zone. Preferably, the bulk of the light, stable hydrocarbon stream will lie within a boiling point range which is lower than the boiling point(s) of most, and most desirably all, of the unstable components which accumulate in the lower section of the high pressure fractionating zone. Suitable, non-limiting examples of a light, stable hydrocarbon stream for use in the depropanization of hydrocarbons would include methane, ethane, propane, isopropane, propylene, mixtures of the above compounds, etc. As shown in FIG. 2, a convenient source of the light, stable hydrocarbon stream can be provided by hydrogenating and fractionating at least a portion of the overhead fraction from the high pressure fractionating zone. The hydrogenated material, which will be a mixture of various components will comprise saturated $C_3$ hydrocarbons (propane, ispropane, together with lesser amounts of propylene and minor amounts of perhaps ethane, ethylene, etc.) It will be appreciated that the precise composition of such a hydrogenated $C_3$ overhead fraction will depend upon the nature of the feed to the fractionating column, the composition of the $C_3$ overhead recovered and the degree of hydrogenation and fractionation carried out in the hydrogenation zone.

The light, stable hydrocarbon stream can be introduced at virtually any point in the fractionating column, i.e. into either the high pressure or low pressure fractionating zones. However, it is preferable, particularly in the case of the depropanzation of hydrocarbons, that the light, stable hydrocarbon stream be introduced into the lower section, and preferably the reboiler inlet of the high pressure fractionation section. Numerous advantages are achieved by introducing the light, stable hydrocarbon stream into the dual pressure fractionation column. Again, with particular reference to the depropanization of hydrocarbons, it is known that unstable compounds such as methyl acetylene, propadiene, vinyl acetylene, and other such highly unsaturated materials tend to accumulate, primarily in the lower section of the high pressure fractionating zone. By introducing the light, stable hydrocarbon stream at the bottom of the high pressure fractionating zone, there will be a dilution effect, i.e. the unstable, highly unsaturated components will be diluted with the generally lighter, i.e. lower boiling, and considerably more saturated hydrocarbons. Additionally, the introduction of the light, stable hydrocarbon stream in the lower or reboiler section of the high pressure fractionating zone reduces the temperature in the lower part of that zone due to the "carrying effect" produced by the light components, i.e. the components in the light, stable hydrocarbon stream. The light, stable hydrocarbon stream also acts as a stripping agent with the result that the unstable components concentrated in the bottom of the high pressure fractionating zone will tend to be carried upwardly in the column as the lighter components of the light, stable hydrocarbon stream move up the column. Thus, for example, unstable components which are introduced with the feed into the intermediate section of the high pressure fractionation section are not allowed to concentrate in the lower or reboiler section of the high pressure fractionating zone. Thus, a lower, maximum concentration of unstable components is achieved. Since the light, stable hydrocarbon stream does act as a stripping agent as the lighter components move upwardly in the column relative to the heavier components, the point of maximum concentration of unstable components is moved upwardly in the high pressure fractionating zone and hence to a point of generally lower temperature. The net result is to prevent potentially dangerous accumulations of the unstable components in high temperature, high pressure environments which could result in detonation.

The amount of light, stable hydrocarbon introduced will depend on parameters such as the type of feed, the amount of unstable components present, the pressure and temperature in the high pressure fractionating zone, flow rates, etc. Generally speaking the light, stable hydrocarbon(s) will be introduced in an amount sufficient to effect a lowering of the maximum concentration of the unstable components in the high pressure fractionating zone and/or to effect a lower temperature at the point of maximum concentration of the unstable components in the high pressure fractionating zone. It has been found that, in the case of the depropanization of hydrocarbons, the light, stable hydrocarbon stream is desirably added in amounts of from about 5 to about 20 mol percent (based on the net overhead fraction from the high pressure fractionating zone), amounts of about 10 mol percent being especially preferred.

In order to demonstrate the utility of the present invention and the improved results obtained in a typical dual pressure process for the depropanization of hydrocarbons, basic computer simulations were conducted. In the simulations, the temperature and pressure conditions were substantially those set forth above in connection with the description of the processes depicted in FIGS. 1 and 2. The high pressure fractionating section is provided with 10 theoretical trays. The feed to the high pressure section, i.e. the feed line 22, is comprised approximately 70 mol percent $C_3$'s and 30 mol percent $C_4$'s, the $C_3$'s being comprised of 5.98% of a mixture of methyl acetylene and propadiene. The hydrocarbon feed stream introduced into the low pressure fractionating zone, i.e. through line 24, is comprised of approximately 12 mol percent $C_3$'s and 88 mol percent $C_4$'s, the $C_3$'s being made up of approximately 2.2% of a mixture of methyl acetylene and propadiene. The light, stable hydrocarbon stream is introduced into the lower section, approximately the reboiler inlet, of the high pressure fractionating section. The stable, hydrocarbon stream is comprised of a hydrogenated and fractionated $C_3$ overhead stream recovered from the high pressure fractionating zone. Approximately 10 mol percent (based on the net overhead from the high pressure fractionating zone) of the light, stable hydrocarbon is introduced. The pertinent data and results are shown in Table I below:

TABLE I

|  | Case I<br>No Injection of Light, Stable Hydrocarbon | Case II<br>Injection of Light, Stable Hydrocarbon |
|---|---|---|
| Amount of Light, Stable Hydrocarbon Injection | — | 7046 lbs/hr |
| Net Overhead Rate | 70,026 lbs/hr | 77,107 lbs/hr[1] |
| Net Bottoms Rate | 70,885 lbs/hr | 70,895 lbs/hr |
| Location of Maximum Concentration of Unstable Components | 3rd theoretical tray from bottom of high pressure fractionation section | 5th theoretical tray from bottom of high pressure fractionation section |
| Maximum Concentration of Unstable Components | 22.39 mol % | 11.79 mol % |
| Temperature at Point of Maximum Concentration of Unstable Components | 150° F. | 136° F. |
| Reboiler Temperature | 174° F. | 173° F. |

[1]Includes 7046 lbs/hr of light, stable hydrocarbon steam

As the results in Table I show, the utilization of the process of the present invention results in a lowering of the maximum concentration of the accumulating unstable components in the high pressure fractionating zone, and a reduction in the temperature at the point of maximum concentration of such unstable components. Note that the maximum concentration of unstable components is cut approximately in half while the temperature reduction at the point of maximum concentration of the unstable components is reduced by 14° F. Furthermore, the point, in the high pressure fractionating zone, where the maximum concentration occurs is displaced upwardly in the high pressure section. While not only ensuring a lower temperature zone, such upward displacement minimizes fouling of the high pressure section reboiler brought on by polymerization of the highly unsaturated, i.e. unstable components.

While the invention has been described with considerable particularity, it is to be understood that many changes and modifications may be made in the process without departing from the spirit and scope of the invention. Accordingly, it is intended that the scope of the invention be limited only by the claims which follow.

We claim:

1. In a process for the dual pressure fractionation of a hydrocarbon feed stream containing unstable components comprising the steps of maintaining a high pressure fractionating zone, maintaining a low pressure fractionating zone, the pressure in said low pressure fractionating zone being lower than the pressure in said high pressure fractionating zone, introducing said hydrocarbon feed stream into one of said fractionating zones, recovering an overhead fraction from said low pressure fractionating zone, increasing the pressure of said recovered overhead fraction to the pressure of said high pressure fractionating zone, introducing said pressurized overhead fraction into said high pressure fractionating zone, recovering a first portion of the bottoms fraction from said high pressure fractionating zone, reducing the pressure of said recovered first portion of said bottoms fraction, introducing the depressurized first portion of said bottoms fractions into said low pressure fractionating zone, the improvement comprising:

introducing a stable hydrocarbon stream comprising hydrogenated overhead fraction from said high pressure fractionating zone into one of said fractionating zones, said stable hydrocarbon stream being stable under the conditions existing in said high pressure fractionating zone, at least a portion of said stable hydrocarbon stream having a boiling point lower than the boiling point of at least one of said unstable components which accumulates in said high pressure fractionating zone.

2. The process of claim 1 wherein said stable hydrocarbon stream is introduced into said high pressure fractionating zone.

3. The process of claim 2 wherein said stable hydrocarbon stream is introduced into the lower section of said high pressure fractionating zone.

4. The process of claim 1 including recovering a portion of the bottoms fraction from said low pressure fractionating zone, heating said recovered bottoms fraction from said low pressure fractionating zone to a temperature in the range existing in said low pressure fractionating zone and returning said heated, recovered bottoms fraction from said low pressure fractionating zone to said low pressure fractionating zone.

5. The process of claim 1 including recovering a second portion of the bottoms fraction from the high pressure fractionating zone, heating said second portion to a temperature in the range existing in said high pressure fractionating zone and returning said second, heated portion to said high pressure fractionating zone.

6. The process of claim 1 including condensing overhead vapors recovered from said high pressure fractionating zone and returning a portion of said condensed overhead fraction to said high pressue fractionating zone.

7. The process of claim 1 wherein said stable hydrocarbon stream comprises a saturated hydrocarbon.

8. The process of claim 1 wherein said hydrocarbon feed stream contains primarily $C_3$ and $C_4$ hydrocarbons.

9. In a process for the depropanizing fractionation of a hydrocarbon feed containing unstable components comprising the steps of maintaining a high pressure fractionating zone at a temperature and pressure sufficient to effect vaporization of the $C_3$'s maintaining a low pressure fractionating zone at a pressure which is less than the pressure in said high pressure fractionating zone, and at a temperature to prevent substantial polymerization of the bottoms fraction in said low pressure fractionating zone, delivering said hydrocarbon feed to one of said fractionating zones, heating a portion of the bottoms fraction from the low pressure fractionating zone and which contains primarily $C_4$'s and heavy hydrocarbons to a temperature in the range existing in the low pressure fractionating zone, and returning said heated bottoms portion of said low pressure fractionating zone, condensing overhead vapors from the low pressure fractionating zone to produce a low pressure, condensed fraction, elevating the pressure of the low pressure, condensed fraction to the pressure of the high pressure fractionating zone, reducing the pressure of a first portion of the bottoms fraction from the high pressure fractionating zone and delivering said depressurized first portion of said bottoms fraction from said high pressure fractionating zone to said low pressure fractionating zone, heating a portion of the bottoms fraction from the high pressure fractionating zone to a temperature in the range existing in said high pressure fractionating zone and returning said heated bottoms fraction to the high pressure fractionating zone, the improvement comprising:

introducing a hydrocarbon stream comprising hydrogenated overhead fraction from said high pressure fractionating zone into one of said fractionating zones, said hydrocarbon stream being stable under the conditions existing in said high pressure fractionating zone, at least a portion of said hydrocarbon stream having a boiling point lower than the boiling point of at least one of said unstable components which accumulates in said high pressure fractionating zone.

10. The process of claim 9 wherein the pressure and temperature in said high pressure fractionating zone is maintained in the ranges 160–250 p.s.i.a. and 145°–195° F., respectively, and the pressure and temperature in said low pressure fractionating zone is maintained in the ranges 75–140 p.s.i.a. and 145°–195° F., respectively.

11. The process of claim 9 wherein said portion of said bottoms fraction from said low pressure fractionating zone is heated to a temperature in the range 145°–195° F.

12. The process of claim 9 wherein said portion of said bottoms fraction from said high pressure fractionating zone is heated to a temperature in the range 145°–195° F.

13. The process of claim 9 including condensing overhead vapors consisting primarily of $C_3$'s from the high pressure fractionating zone to produce a $C_3$'s condensed fraction and returning a portion of said $C_3$'s condensed fraction to the high pressure fractionating zone.

14. The process of claim 11 wherein said portion of said bottoms fraction from said low pressure fractionating zone is heated to approximately 165° F. prior to re-entry into said low pressure fractionating zone.

15. The process of claim 12 wherein said portion of said bottoms fraction from the high pressure fractionating zone is heated to a temperature of approximately 170° F. prior to re-entry into said high pressure fractionating zone.

16. The process of claim 15 wherein the overhead vapors from the low pressure fractionating zone are condensed at a temperature of 75°–120° F., and the overhead vapors from said high pressure fractionating zone are condensed at a temperature of 75°–110° F.

17. The process of claim 9 wherein said hydrocarbon

18. The process of claim 9 wherein said hydrocarbon stream comprises propane. stream is introduced into said high pressure fractionating zone.

19. The process of claim 17 wherein said hydrocarbon stream is introduced into the lower part of said high pressure fractionating zone.

20. The process of claim 19 wherein said hydrocarbon stream is introduced into the reboiler inlet of said high pressure fractionating zone.

21. The process of claim 9 wherein said hydrocarbon stream in introduced in an amount sufficient to lower the maximum concentration of said unstable components and/or effect a lower temperature at the point in said high pressure fractionating zone of said maximum concentration of said unstable components.

22. The process of claim 9 wherein the amount of said hydrocarbon stream introduced into said one of said fractionating zones is from about 5 to about 20 mol % based on the net overhead fraction from said high pressure fractionating zone.

23. The process of claim 22 wherein said amount of said hydrocarbon stream is about 10 mol %.

24. The process of claim 1 wherein said hydrocarbon stream is introduced into the reboiler inlet of said high pressure fractionating zone.

* * * * *